United States Patent [19]
Breitkopf et al.

[11] Patent Number: 4,722,062
[45] Date of Patent: Jan. 26, 1988

[54] METHOD AND APPARATUS FOR THE CONTROL OR MONITORING OF THERMAL TURBOMACHINES BASED ON MATERIAL STRESSES

[75] Inventors: Guenter Breitkopf; Thomas Speer, both of Munich, Fed. Rep. of Germany

[73] Assignee: Motoren-und Turbine-Union Munchen GmbH, Munich, Fed. Rep. of Germany

[21] Appl. No.: 725,089

[22] Filed: Apr. 19, 1985

[30] Foreign Application Priority Data

Apr. 21, 1984 [DE] Fed. Rep. of Germany ....... 3415165

[51] Int. Cl.⁴ .............................................. F01D 19/02
[52] U.S. Cl. ..................................... 364/508; 364/557; 374/112; 374/144
[58] Field of Search ............... 364/494, 507, 508, 552, 364/557, 152; 73/117.3; 60/646; 374/102, 110, 112, 144, 129

[56] References Cited

U.S. PATENT DOCUMENTS

| | | | |
|---|---|---|---|
| 3,719,071 | 3/1973 | Hohenberg | 374/144 |
| 3,828,606 | 8/1974 | Wolter | 374/102 |
| 4,029,951 | 6/1977 | Berry et al. | 364/494 |
| 4,228,359 | 10/1980 | Matsumoto et al. | 60/646 |

*Primary Examiner*—Errol A. Krass
*Assistant Examiner*—V. N. Trans
*Attorney, Agent, or Firm*—Roberts, Spiecens & Cohen

[57] ABSTRACT

Apparatus and method for determining transient temperature and stress distributions in turbomachines and system components as a function of operating conditions where direct measurements on the rotating components are prevented. The apparatus includes a microprocessor which computes temperature and stress distributions in real time for components of complex shapes. The apparatus employs a memory containing a set of standard temperature distributions under particular operating conditions and the temperature stresses in the component are estimated on the basis of the closest temperature distributions in the set. The apparatus can be embodied as an on-board in-flight LCF monitor of aircraft engine rotors or as an LCF monitor of a turbomachine for power generation such as a stationary turbine generating unit.

18 Claims, 6 Drawing Figures

METHOD AND APPARATUS FOR THE CONTROL OR MONITORING OF THERMAL TURBOMACHINES BASED ON MATERIAL STRESSES

FIELD OF THE INVENTION

This invention relates to apparatus and methods for the open- or closed-loop control or monitoring of thermal turbo-machines, especially aircraft engines.

More particularly, the invention relates to such apparatus in which control or monitoring is based on the material stresses of the rotating and thermally stressed components, when these components prevent direct measurement of the respective prevailing temperatures and of the thermally induced stresses and in which rapid variations in operating parameters arise that cause a substantially non-linear relation in the component on the operating condition, on the one hand, and temperature on the other hand.

BACKGROUND AND PRIOR ART

In machine and system components that are subject to elevated temperatures and temperature variations during operation, temperature differences are encountered that vary with the operating conditions. In the steady-state condition these differences depend only on the operating conditions prevailing at the moment, while in the transient condition they also vary with the preceding operating conditions or the preceding component temperatures. These temperature differences cause thermal stresses that add to the stresses from external loads, such as individual forces, pressures, etc., and that often make up a significant part in the total stresses in the material. Additionally, elevated temperatures may severely reduce the strength of the material.

Both the instantaneous load on the material, once it exceeds certain values, and the cyclic load arising during the entire service period, i.e. Low Cycle Fatigue (LCF hereafter) will cause damage to the component. Both must therefore be monitored and if at all possible, considered in the open- or closed-loop control of the machine.

For this purpose, the material temperatures and the thermally induced stresses in the components must be determined as a function of the actual course of operation. Direct measurement of these parameters is often prevented, and especially with rotating components, temperatures and thermal stresses are very often impossible to measure. Yet it is difficult to determine them accurately from other, more readily available measureable parameters, especially if the components are complex in geometry and because temperature development within a component varies with time. Up to now there are no means known for determining the temperature distributions which are at the same time fast and precise enough for the said purpose. It is necessary to determine temperature and material stresses in real time as well for the open- and closed-loop control duty as for the monitoring purpose. For the latter, this is necessary because otherwise unacceptable data storage capacities must be provided. This is particularly the case for aircraft engines.

For stress analysis and in the determination of LCF effect in operation, centrifugal forces as well as the thermal stresses must be evaluated as a function of engine service. The only instantaneous operating condition data available are general flight and operating parameters, such as conditions at the engine inlet, rotor speeds and gas temperature in the primary flow downstream of the combustion chamber. Temperature measurements on the rotor are prevented. From the available parameters, the associated temperature distribution and thermal stress profiles must be determined.

U.S. Pat. No. 4,228,359 discloses means for controlling thermal turbomachines in which the rotor temperature is evaluated based on an assumption that the rotor is a one-dimensional heat conductor, namely, an infinitely long cylinder of locally constant heat transfer on the cylindrical surface (cf. column 16, lines 1 to 10). It has been found that this ignores the mutual dependence of the temperatures in the different regions of the rotor and does not permit an adequate and accurate determination of the actual temperature distribution in real-time operation. This is due to the fact that the rotors of turbines are components of essentially disk-shape basic configuration in which the heat transfer is considerable at the lateral faces. Since at any time, the temperatures of the working medium differ greatly along the lateral faces of the disk and additionally may vary from one lateral face to the other, and since the temperature distributions of the working medium along the lateral faces of the disk are additionally subject to considerable variation with time, the heat transfer at the lateral disk faces is a paramount factor for the temperature distribution in the rotor. Ignoring this temperature transfer, therefore, will produce considerable inaccuracies.

SUMMARY OF THE INVENTION

It is a broad object of the present invention to provide a method and apparatus for the determination of the temperature distribution in components of complex geometry and of a disk-like basic shape, especially for turbine disks, in which a considerable amount of heat is transferred both at the cylindrical surface and the lateral faces of the disk. The apparatus further provides means for taking into consideration the time-related variation of the temperature of the working medium at the lateral faces of the disk and to the exchange of heat with further components connected to the disk. Additionally, the apparatus also employs means for measuring parameters which are already known for other purposes or are readily available, and do not require additional test points on the component involved.

It is a particular object of the present invention to provide a portable device for a turbomachine in which the instantaneous temperature distribution of the rotating components is determined at intervals based on the temperature distribution prevailing in said component at the beginning of each interval and on the actual temperature variation rate, and the thermal stresses and material fatigue in the component are determined from the temperature distribution, where the actual temperature variation rate for the component is obtained as follows:

(a) the determined temperature distribution in the component prevailing at the beginning of an interval is compared with a set of standard temperature distributions previously determined for said component under certain conditions and stored in a memory of the apparatus of the invention, (b) in a selector circuit, standard temperature distributions are selected from the set of standard distributions in the memory which are closest to the temperature distribution prevailing in the component at the beginning of the interval, (c) temperature variation rates (i.e. temperature transfer function) determined from the standard temperature distributions in the memory are modified in accordance with the difference between the actual operating conditions (speed, gas temperature, gas pressure) and the operating conditions from which the standard temperature distributions were obtained, and (d) the desired, actual temperature variation rate for the respective interval is derived from the modified temperature variation rates by weighted averaging.

A number of advantages are obtained by the present invention as exemplified hereafter.

The invention permits instantaneous temperature distributions and thermally induced material stresses to be determined for components which do not permit direct temperature and stress measurements. In the course of the determination, the time-related response of the heat conductive structure is taken into account which makes the determination very accurate. The apparatus of the present invention can be integrated into the machine or system under evaluation and it gives the results in real time.

From the temperatures and material stresses determined by the means of the present invention, the resultant LCF effect can be computed conventionally in an output computer over the entire operating period, and displayed whenever desired. Maintenance and inspection intervals or component replacement dates reflecting the determined LCF effect can be evaluated.

The evaluated data also permits the time-related development of component temperature distribution to be determined, beginning with any starting distribution, at a hypothetical profile of the operating parameters (speed, temperature, pressure, power, etc.), and thermally induced material stresses and the resultant fatigue to be predicted in a relatively simple manner and at any time desired. This is then used, in the presence of load change demands or variations in individual parameters, to determine the anticipated component temperatures and thermally induced material stresses. Depending on the result, the required change in load or operating parameters of the machine is then effected.

BRIEF DESCRIPTION OF THE DRAWING

Several embodiments of the present invention will be described hereafter with reference to the schematic arrangements shown in the accompanying drawing, in which.

DETAILED DESCRIPTION OF PREFERRED EMBODIMENTS

Figure 1:
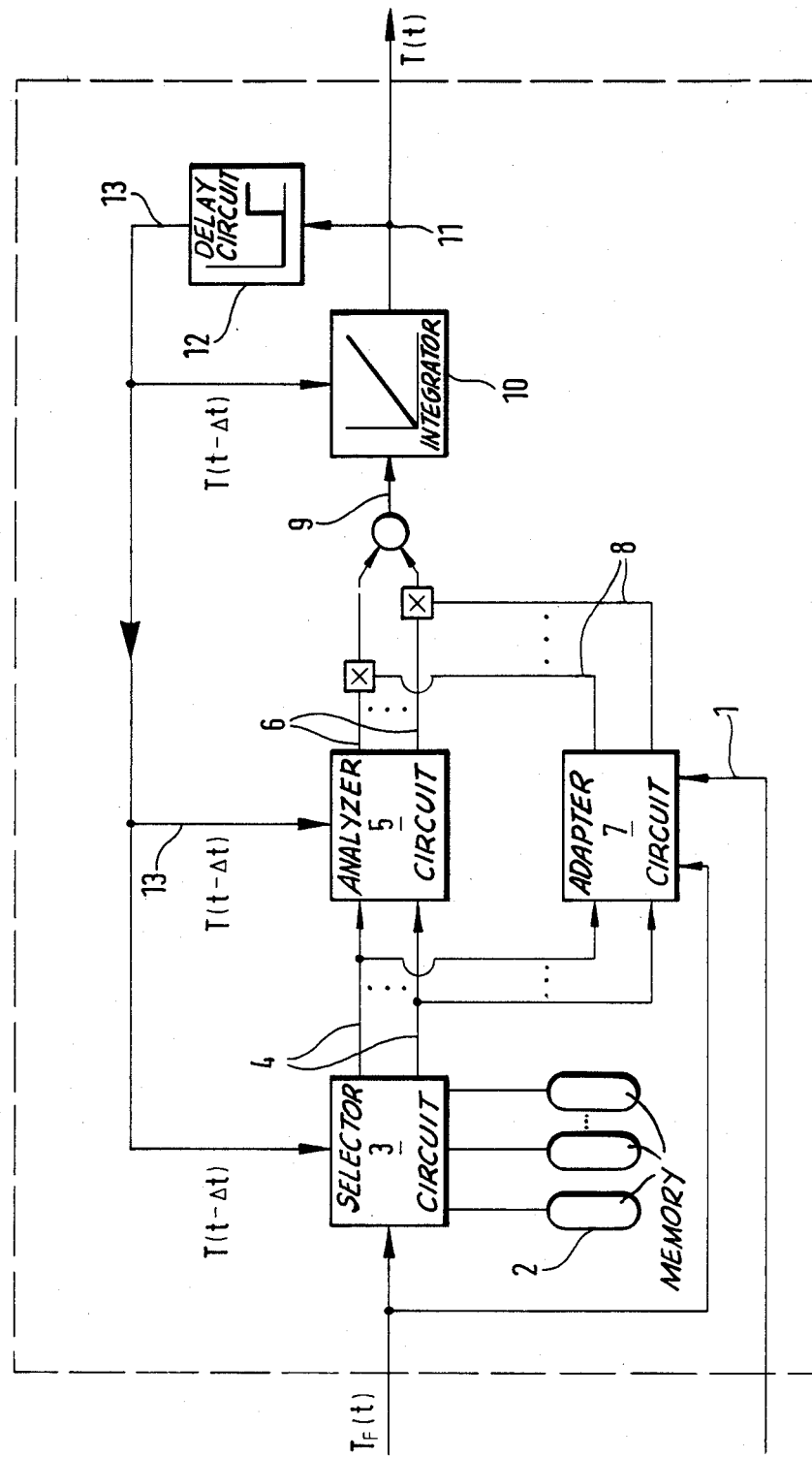
FIG. 1 is a schematic view of a processor for determining service-related temperature distribution.

FIG. 1 schematically illustrates the construction of a processor for determining the time temperature distribution history of the components of a turbomachine under certain operating conditions.

The continuous temperature distribution in the component under consideration is approximately given by the temperatures at a limited number of points in the component. The transient changes of these temperature distributions $T(t)$ is determined at suitably selected intervals $\Delta t$.

An input signal $T_F(t)$ for the processor includes service-related temperatures (e.g. temperature of working medium) or equivalent quantities that control the temperature of the component. These temperatures are measurable and represent reference temperature values $T_F$. Any further machine-related parameters that may affect the heat transfer and conductance behavior of the component (e.g. rotational speed, working medium pressure) are input as signal 1 and these are also measurable quantities.

A ROM 2, which serves for data storage, contains a set of standard temperature profiles describing the progressive development of certain starting temperature distributions under selected standard service conditions and consisting of a series of transient temperature distributions.

A selector circuit 3 has an input from line 13 representing the actual temperature distribution $T(t-\Delta t)$ of the component, and this is compared, at the beginning of each interval, with the standard temperature profiles from the ROM 2. In the selector circuit 3 transient standard temperature distributions 4 are selected which deviate least from the actual temperature distribution, with due consideration being given the difference between actual reference temperature and the reference temperature that entered into the determination of the standard temperature profiles An analyzer circuit 5 receives output signals 4 from selector circuit 3 and in the analyzer circuit 5, weighting factors 6 are produced such that the actual temperature distribution can be represented as a weighted mean of the selected standard temperature distributions.

The change rates at which the standard temperature profiles are varying can be read from memory 2 of the standard temperature profiles. In an adaptor circuit 7, the temperature variation rates are adapted to the actual service conditions by determining, from these conditions, a factor by which to affect the variation rates of the standard temperature distributions. This is done uniformly for all component points considered. Determination of this factor is specific to the machine and varies with the available readings of the service parameters 1. Resultant temperature variation rates 8 are averaged using the weighting factors 6 selected by the analyzer circuit 5 to give an actual temperature variation rate 9 for the respective operating condition. Upon completion of the interval $\Delta t$ in an integrator circuit 10 a resultant temperature is supplied as an output in desired form at an output 11. In the succeeding time interval, this temperature is available at the output of a time delay element 12 as the actual temperature 13. This is supplied as a feedback to selector circuit 3, analyzer circuit 5, and integrator circuit 10.

Experience has shown that the thermally induced material stresses can, for any region of the component involved, be determined from the respective temperature distribution as a function of the respective design of the component.

Figure 2:
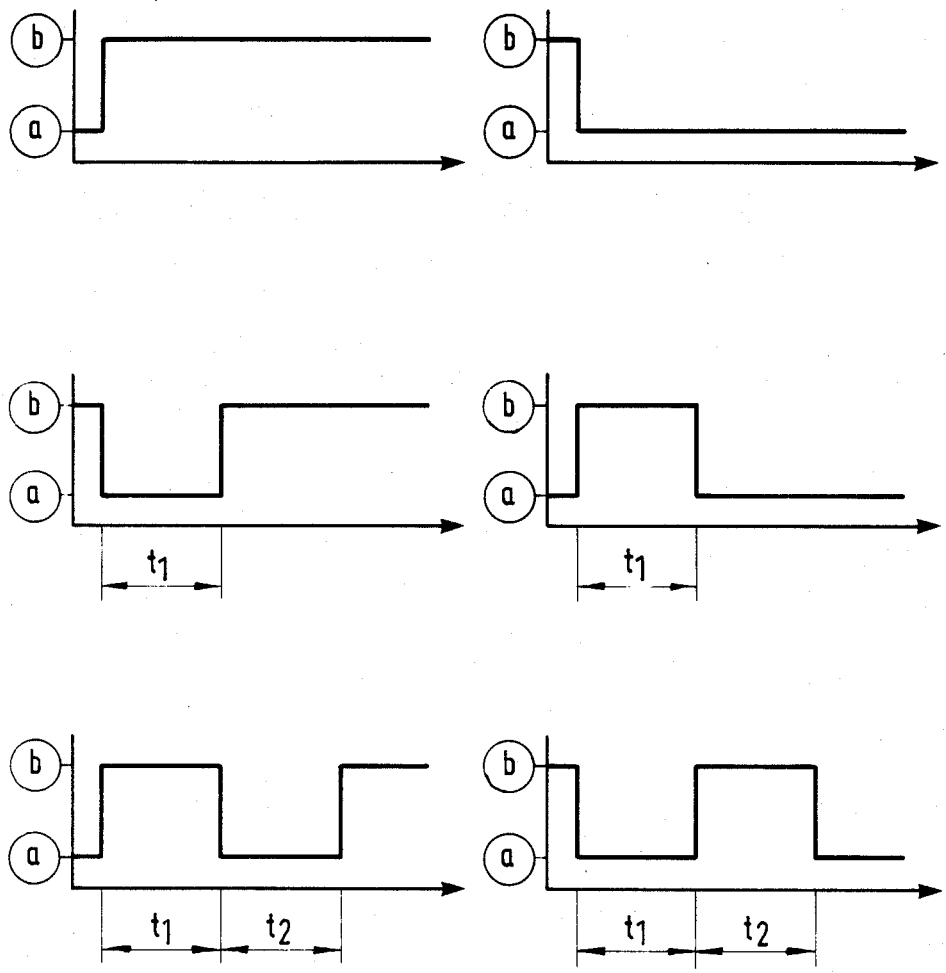
FIG. 2 graphically illustrates operating profiles utilized in the computation of standard temperature profiles in a typical application.

FIG. 2 illustrates the service profiles versus time t for a typical application, for which the temperature development is computed by finite element methods and stored in the ROM 2 as standard temperature profiles. These service profiles alternate between two operating conditions designated a and b, where these operating conditions are held constant both for the time $t_1$ and $t_2$ selected and at the respective last assumed level until a stationary temperature distribution is reached. The temperature distribution at the beginning of each standard temperature profile is assumed to be stationary but can generally be defined at will.

Figure 3:
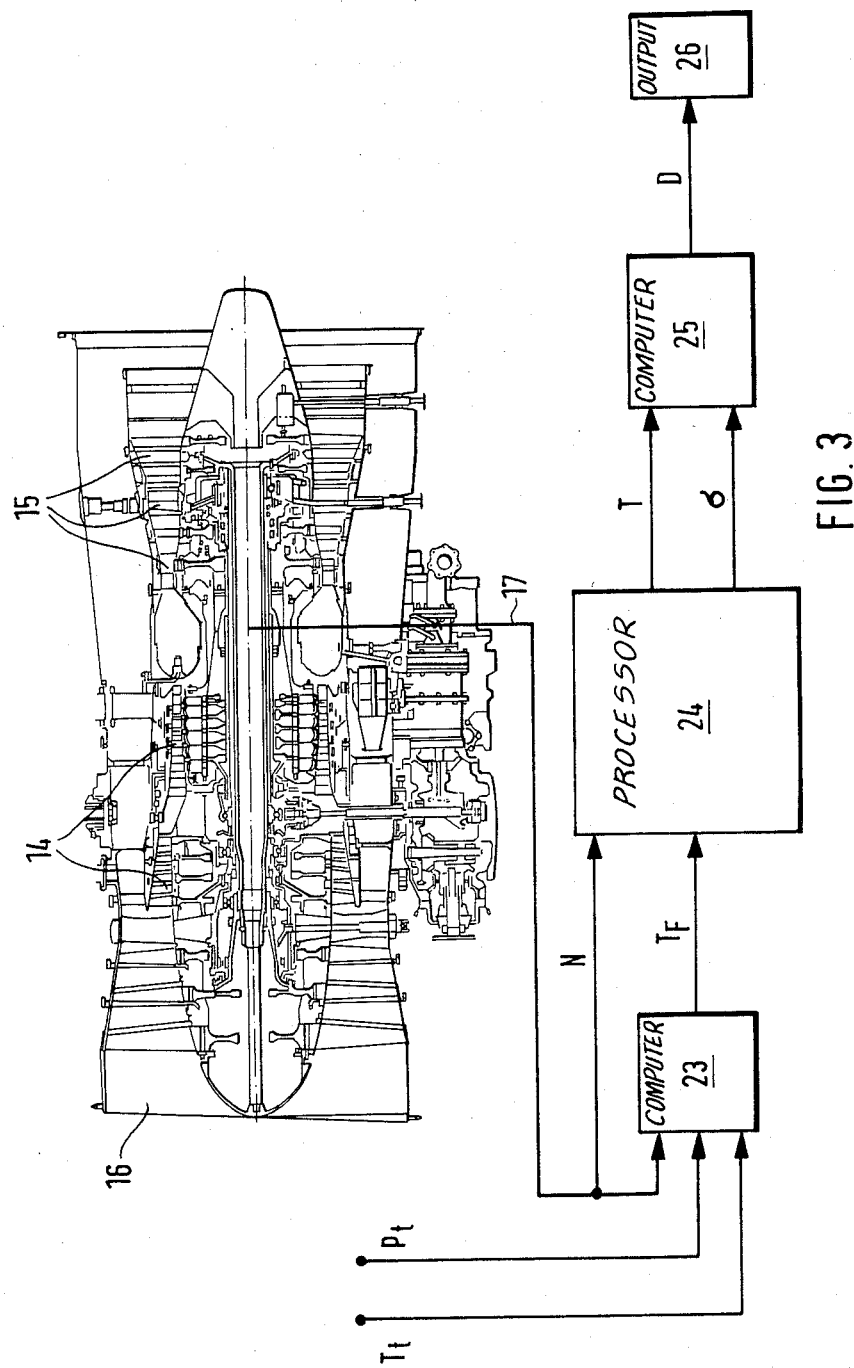
FIG. 3 schematically illustrates apparatus for determining and monitoring the life of aircraft engine rotors with respect to LCF effects.

The embodiment of FIG. 3 is illustrated in conjunction with an aircraft gas turbine engine. The disks of compressor rotors 14 and turbine rotors 15 contain a number of zones whose LCF life consumption requires monitoring. The overall temperature $T_t$ and pressure $P_t$ of the working medium at the engine inlet 16 and the speed N of the shaft 17 are measured as parameters characteristic of engine service.

Signals representative of $T_t$, $P_t$ and N are fed to a computer 23 which produces reference temperature $T_F$, which here is the temperature of the working medium at the respective stage, for the compressor and turbine stages of the respective rotor. In a processor 24, the reference temperature $T_F$ and the speed N are used to determine, for each interval $\Delta t$, the temperature distribution T in the disk under consideration and the associated thermal stresses $\sigma$. These values are fed to a computer 25, which computes and accumulates the corresponding LCF effect D and supplies it at the output 26 where it can be displayed.

Figures 4, 5:
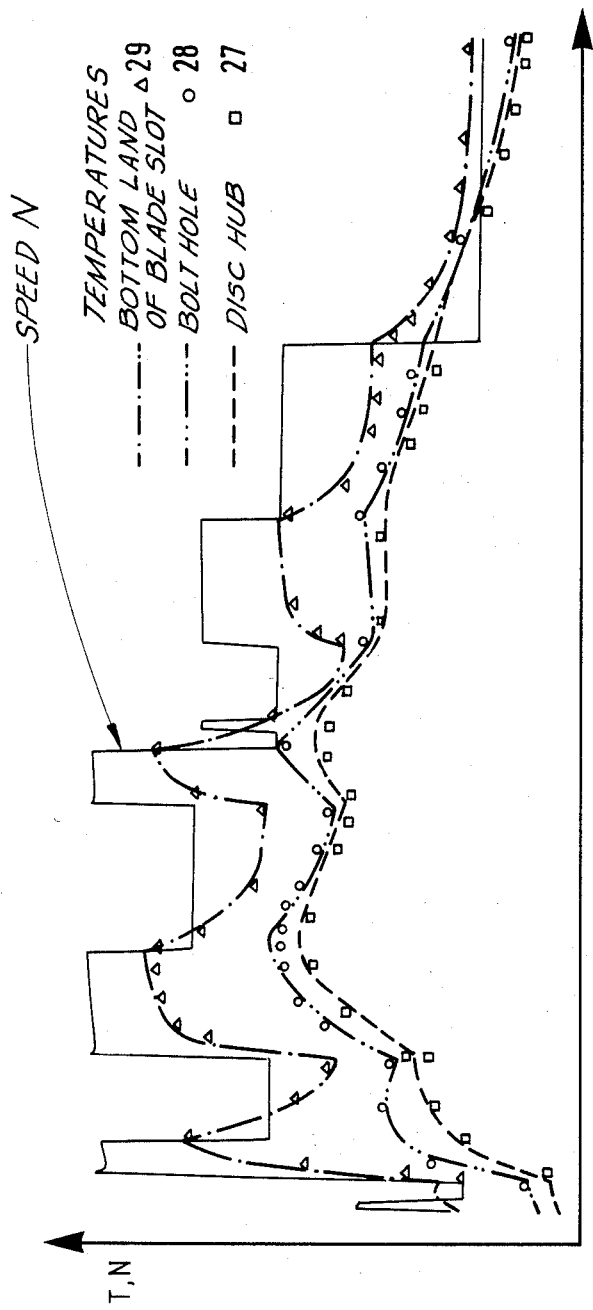
FIG. 4 graphically illustrates a comparison of temperatures determined by the method and apparatus of the invention with results from finite element computations.
FIG. 5 is a cross-sectional view illustrating a rotor disk showing critical areas thereof.

FIG. 4 illustrates the good agreement existing between the temperatures T determined by means of the method and apparatus of the invention and the temperatures T exactly computed by means of finite element methods (FEM) for an extended operating period at the highly stressed points at the disk hub 27, the bolt hole 28 and the bottom land 29 of the blade slot in the rotor disk 30, as illustrated in FIG. 5. The temperature at the three points 27 to 29 of the disk 30 are plotted versus time t in FIG. 4, where the symbols connote the FEM results and the chain lines the temperatures determined by the method and apparatus of the invention. The speed is indicated by the letter N.

Figure 6:
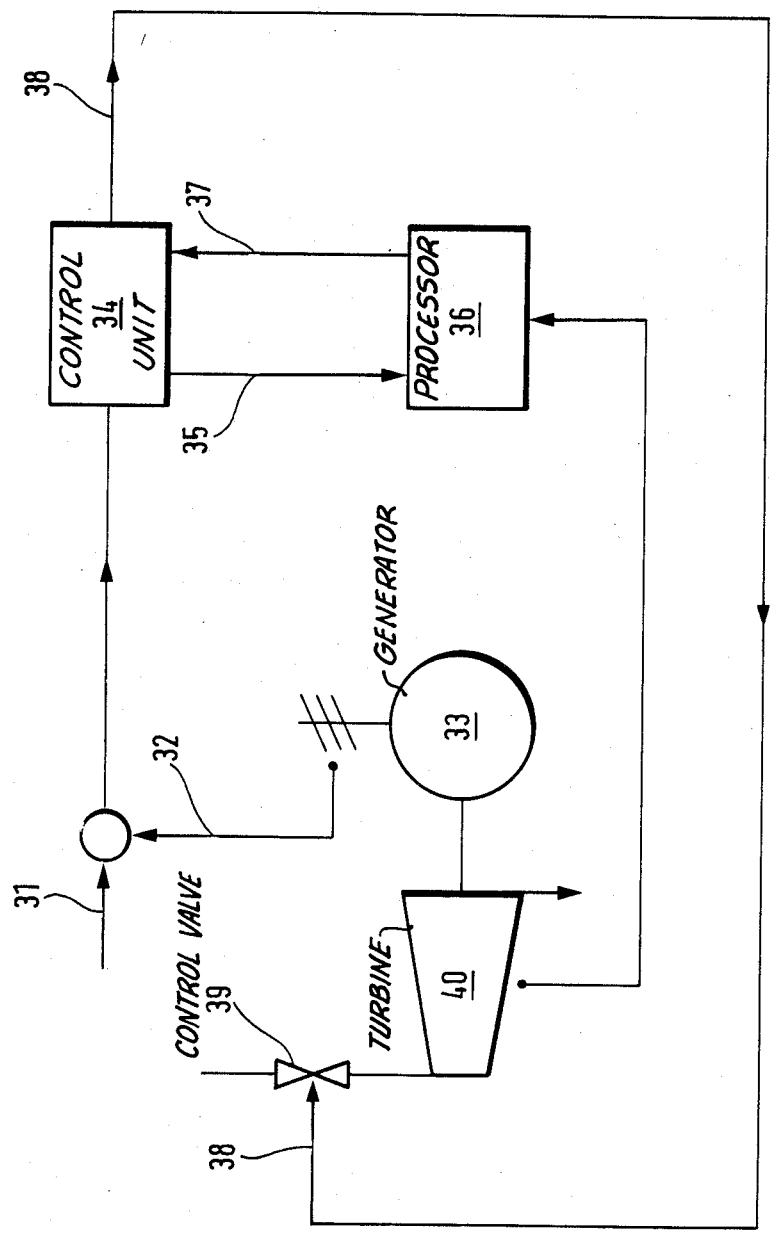
FIG. 6 schematically illustrates apparatus for the open- or closed-loop control of a stationary turbogenerator system in which service-related LCF effects are taken into account.

The embodiment of FIG. 6 illustrates a turbine generator system for the generation of electrical power. At major variations of the operating conditions, especially at start-up or at major load changes, transient temperature distributions are developed in the turbine rotor that may produce considerable thermal stresses and consequent LCF effects. In this embodiment, the means of the present invention represents an additional component for the control unit which minimizes LCF damage resulting from operational changes or keeps the resultant thermal stresses from exceeding certain limits.

Using the set point 31 and the actual value 32 of the output of the generator 33, the control unit 34 computes a value 35 of the actuating variable for the control valve 39 of the turbine 40. The means 36 of the present invention determines the thermal stress or LCF effect resulting from the demand value and supplies this as an output signal 37. Depending on the result, the value 35 of the actuating variable is accepted or reduced to an allowable magnitude and the value 38 of the actuating variable is input to the valve 39.

Although the invention has been described in conjunction with specific embodiments thereof it will become apparent to those skilled in the art that numerous modifications and variations can be undertaken without departing from the scope and spirit of the invention as defined in the attached claims.

What is claimed is:

1. In an apparatus for the control or monitoring of thermal turbomachines, based on material stresses of rotating and thermally stressed components, when these components prevent direct measurement of the respective prevailing temperatures and of the thermally induced stresses and in which rapid variations in operating parameters take place which cause non-linear dependence of the component on the operating conditions, on the one hand, and on the temperature, on the other hand, the improvement comprising means for determining in the real time the instantaneous temperature distribution prevailing in the rotating component at successive intervals from the temperature distribution prevailing in said component at the beginning of each interval and from an actual temperature variation rate, means for determining thermal stresses and material fatigue in said component from said temperature distribution, and means for determining said actual temperature variation rate including:

(a) comparing means for comparing the temperature distribution prevailing in the component at the beginning of an interval with a set of previously determined standard temperature distributions under particular operating conditions, (b) selector means for selecting from the set of standard temperature distributions, those that are closest to the temperature distribution prevailing in the component at the beginning of an interval, (c) means for determining temperature variation rates determined from said standard temperature distributions and for modifying said temperature variation rates in accordance with the difference between the actual operating conditions and corresponding operating conditions at the time of obtaining the standard temperature distributions, and (d) means for obtaining the actual temperature variation rate for the respective interval from the modified temperature variation rates by weighted averaging.

2. The improvement as claimed in claim 1 comprising a portable device placeable at the turbomachine and containing all of said means.

3. The improvement as claimed in claim 1 wherein said means for obtaining the actual temperature variation rate effects weighted averaging of the known temperature variation rates of said standard temperature distributions associated with the temperature distributions selected by said selector means, and the weighted values used for averaging are determined such that averaging therewith of said standard temperature distributions of the standard functions that deviate least from the temperature distribution prevailing at the prior interval will give the temperature distribution prevailing at the prior point in time.

4. The improvement as claimed in claim 1 comprising means for determining the stress resulting in the component under consideration at any time during operation based on the temperature distribution prevailing in said component at the moment and from the actual values of the basic operating parameters.

5. The improvement as claimed in claim 1 comprising means for determining the stress resulting in the component under consideration at any time during operation based on hypothetical operating conditions from the temperature distributions resulting under these conditions and from the basic operating parameters resulting and derived from the hypothetical operating conditions.

6. The improvement as claimed in claim 1 comprising means for displaying the determined values of thermal stress and material fatigue in said component.

7. The improvement as claimed in claim 6 comprising means for display of allowable values of thermal stresses.

8. The improvement as claimed in claim 6 comprising means for indicating when the thermal stress or material fatigue exceeds allowable values.

9. The improvement as claimed in claim 1 comprising means for determining low cycle fatigue of said component based on evaluated temperature variation and means for display thereof.

10. The improvement as claimed in claim 1 wherein said component is a rotor disk of a stationary turbine.

11. A method of controlling or monitoring thermal turbomachines based on material stresses of rotating and thermally stressed components, when these components prevent direct measurement of the respective prevailing temperatures and of the thermally induced stresses and in which rapid variations in operating parameters take place which cause non-linear dependence of the component on the operating condition, on the one hand, and on the temperature, on the other hand, said method comprising determining the instantaneous temperature distribution prevailing in the rotating component at successive intervals from the temperature distribution prevailing in said component at the beginning of each interval and from an actual temperature variation rate, determining thermal stresses and material fatigue in said component from said temperature distribution, said actual temperature variation rate being obtained by the steps comprising:

(a) comparing the temperature distribution prevailing in the component at the beginning of an interval with a set of previously determined standard temperature distributions under particular operating conditions, (b) selecting from the set of standard temperature distributions, those that are closest to the temperature distribution prevailing in the component at the beginning of an interval, (c) determining temperature variation rates from said standard temperature distributions and modifying said temperature variation rates in accordance with the difference between the actual operating conditions and corresponding conditions at the time of obtaining the standard temperature distributions, and (d) obtaining the desired actual temperature variation rate for the respective interval from the modified temperature variation rates by weighted averaging.

12. A method as claimed in claim 11 comprising estimating the instantaneous stress in the component at any time during operation based on the instantaneous temperature distribution prevailing in said component and the actual values of the basic operating parameters.

13. A method as claimed in claim 11 comprising estimating the instantaneous stress in the component at any time during operation based on hypothetical operating conditions from the temperature distributions resulting under these conditions and from the basic operating parameters resulting and derived from the hypothetical operating conditions 14. A method as claimed in claim 11 comprising displaying parameters representing thermal stresses and material fatigue in said component along with allowable limits for said parameters.

15. A method as claimed in claim 11 comprising comparing parameters representing thermal stresses and material fatigue in said component to allowable values thereof and indicating a condition in which said thermal stresses and material fatigue exceed said allowable values.

16. A method as claimed in claim 11 wherein said rotating component is a rotor of an aircraft engine and the material fatigue is low cycle fatigue, said method further comprising monitoring the operation of said rotor based on the relation of the low cycle fatigue caused by the determined stresses to allowable LCF-limits thereof in terms of cyclic life.

17. A method as claimed in claim 11 wherein material fatigue is determined by including measurement of conditions establishing stress in said component apart from thermal stress.

18. A method as claimed in claim 17 wherein the conditions measured apart from thermal stress include rotational speed of the component and pressure of the gas in the turbo-machine.

* * * * *